United States Patent [19]

Pasternak

[11] Patent Number: 5,423,584
[45] Date of Patent: Jun. 13, 1995

[54] GOLF BALL RETRIEVER

[76] Inventor: M. Randall Pasternak, 240 W. Willow Rd., Milwaukee, Wis. 53217

[21] Appl. No.: 301,153

[22] Filed: Sep. 6, 1994

Related U.S. Application Data

[63] Continuation-in-part of Ser. No. 86,265, Jul. 1, 1993, abandoned.

[51] Int. Cl.⁶ .......................... A63B 47/02; F16B 7/14
[52] U.S. Cl. ..................................... 294/19.2; 403/104
[58] Field of Search .................. 294/19.1, 19.2, 55, 294/57; 16/115; 273/32 F, 162 E; 403/104, 109, 292, 293, 341, 351, 352, 365, 367, 368, 377

[56] References Cited

U.S. PATENT DOCUMENTS

| | | | |
|---|---|---|---|
| 2,538,325 | 1/1951 | Pfeiffer | 294/19.2 |
| 2,599,222 | 6/1952 | Bergqvist et al. | 403/104 |
| 2,814,520 | 11/1957 | Ruhland | 294/19.2 |
| 3,235,296 | 2/1966 | Day | 403/109 X |
| 3,520,569 | 7/1970 | Anderson | 294/19.2 |
| 4,277,197 | 7/1981 | Bingham | 403/104 |
| 4,508,467 | 4/1985 | Choffin | 403/104 |
| 4,659,125 | 4/1987 | Chuan | 294/19.2 |
| 4,728,134 | 3/1988 | Allen | 294/19.2 |
| 5,184,859 | 2/1993 | Nihra et al. | 294/19.2 |

Primary Examiner—Johnny D. Cherry
Attorney, Agent, or Firm—Wheeler & Kromholz

[57] ABSTRACT

A golf ball retriever comprises a cylindrical receiver with an inner surface of a diameter slightly larger than a standard golf ball, triangular protrusions or ribs extending upwardly and out from the inner surface at an angle of 5 to 11 degrees, connection tabs, and a stop; a retainer that is substantially V-shaped, with its arms extending over the cylinder; and a telescoping rod with at least two pieces of hollow tubing having different diameters and connected with a tapered shim, a plug, and a cap with a glue reservoir. The receiver rotatably mounts to the retainer, which in turn mounts to the telescoping rod. The telescoping rod is formed by plugging one end of a piece of hollow tubing, wrapping the tapered shim around the tubing, inserting the plugged tubing and shim into a larger piece of hollow tubing, placing a cap over the intersection of the two pieces of tubing, and gluing the cap to the larger piece of hollow tubing.

9 Claims, 4 Drawing Sheets

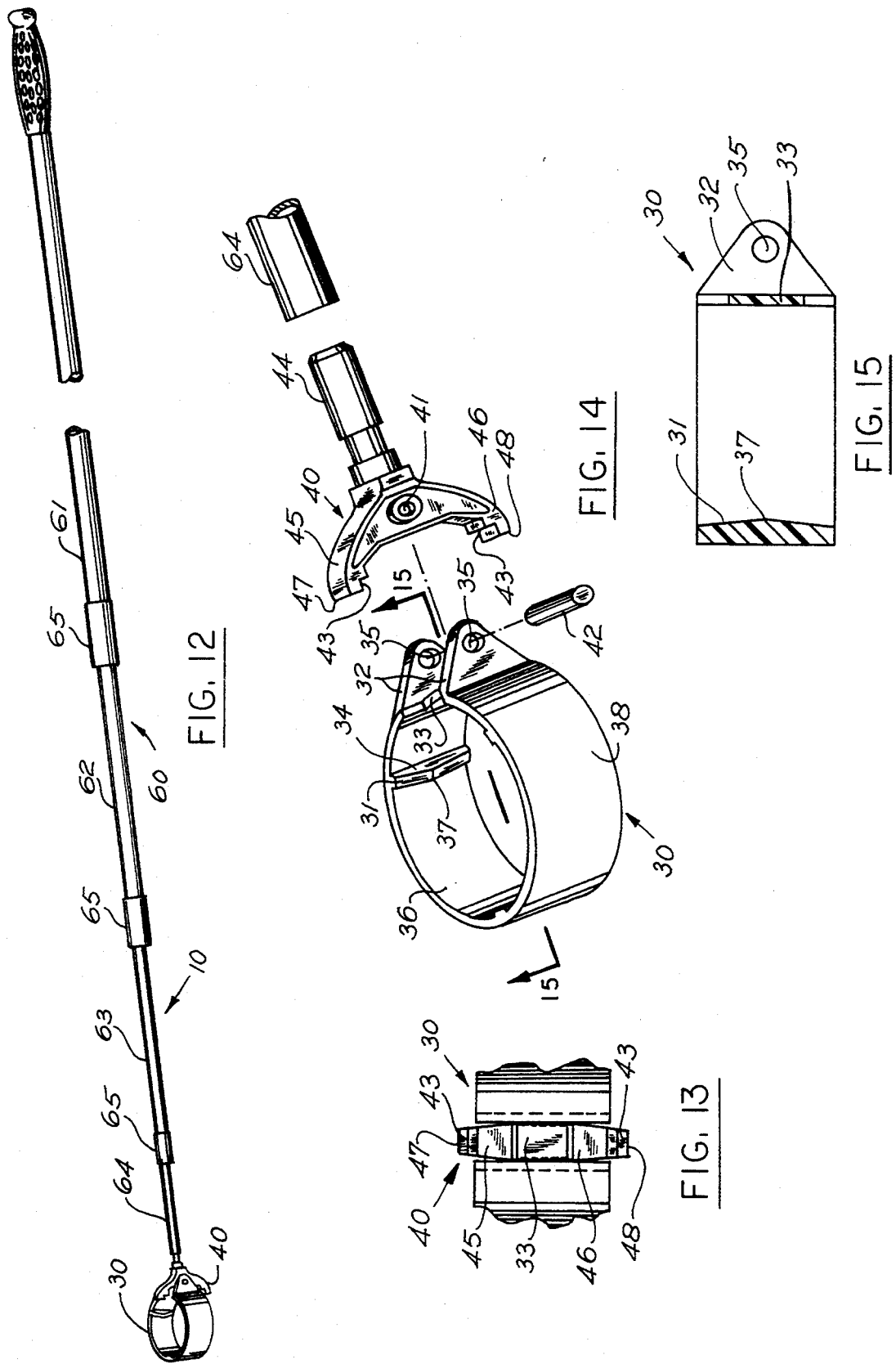

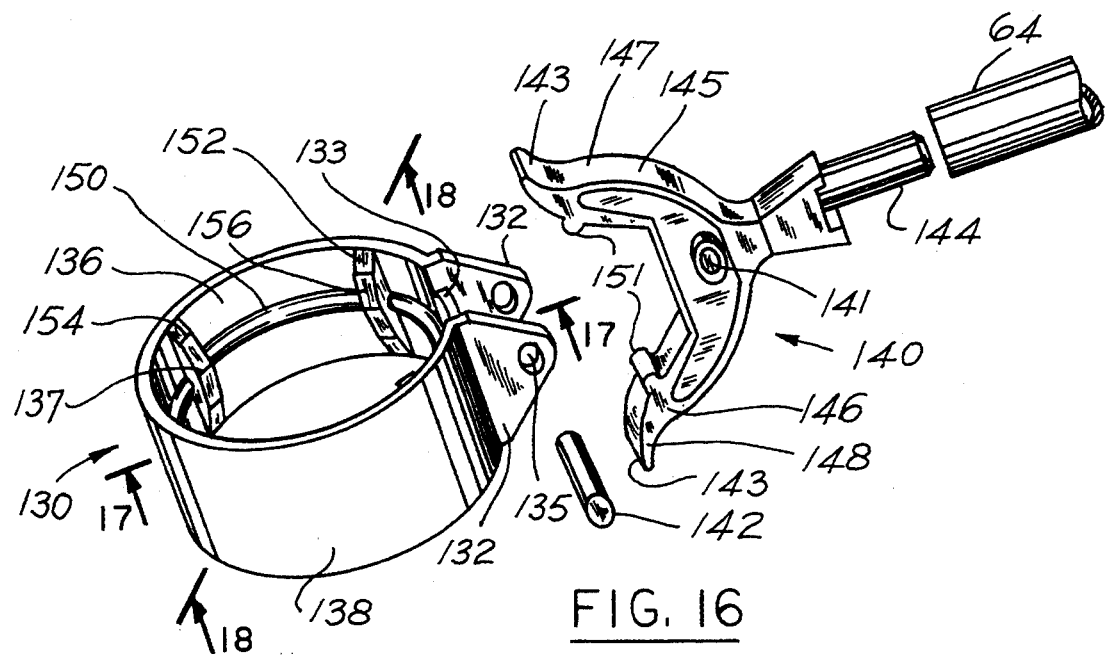
FIG. 16
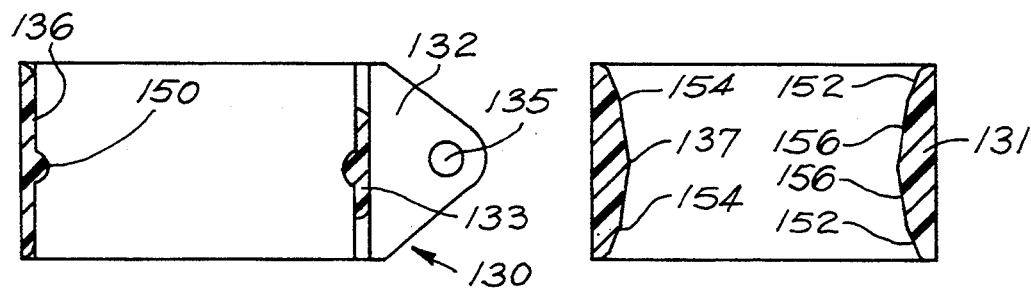
FIG. 17
FIG. 18
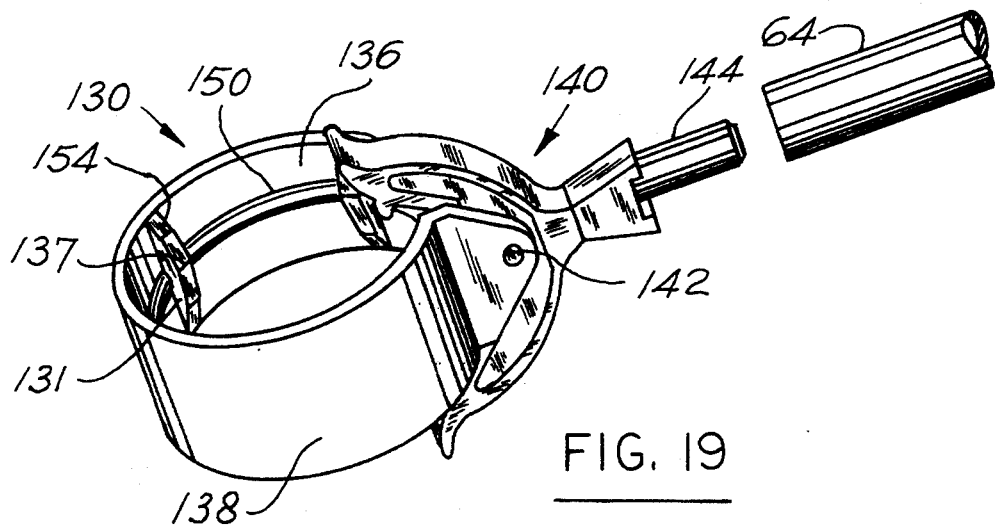
FIG. 19

GOLF BALL RETRIEVER

This application is a continuation in part of application Ser. No. 08/086,265, filed Jul. 1, 1993, now abandoned.

BACKGROUND OF THE INVENTION

The present invention relates generally to the field of golf ball retrievers, and specifically to a golf ball retriever capable of trapping and retaining a golf ball from either end of a cylindrical capture.

There are many devices today used for the purpose of retrieving golf balls from water hazards and other inaccessible areas. These present devices, however, often require a very delicate touch and gentle treatment of the retrieval device. Without such gentle treatment, the ball, even if initially trapped in the retriever falls out due to a lack of ability of the retriever to hold the ball in the retriever once it is trapped.
For example:

U.S. Pat. No. 4,728,134 (Allen) has a receiver or cup with spring loaded bails. The ball is released by squeezing the side members inwardly. The handle relies on friction between the end plug outer diameter and tube inner diameter. A shim is not present.

U.S. Pat. No. 4,073,529 (Ostrin) has a receiver or cup utilizing 3-spring loadedfingers. The ball is entrapped by downward motion. The handle discloses a locking mechanism to prevent relative rotation of handle sections.

U.S. Pat. No. 4,733,681 (Lee) is a combination umbrella and golf ball retriever. The main strut of the umbrella serves as the socket pipe for all of the telescopically nested tubes forming the handle of the golf ball retriever. After a section of the tubing has been extended, an eccentric grooved stud inserted at one end, and matched with a similar eccentric circular bushing, locks against the inner diameter of the larger tube when the tubes are rotated in a first direction. Rotation in the opposite direction will loosen the bushing and allow the tubes to slide freely.

U.S. Pat. No. D283,432 (Rosenow) is a design patent for a Receiving Cup for a golf ball retriever. The design is different from the present invention.

U.S. Pat. No. 4,310,189 (Nihra) is a ball receiver consisting of a ring with a series of embossments around the inner peripheral surface. A telescopic handle is not taught.

U.S. Pat. No. 4,790,338 (Strobl) is a combined golf umbrella and golf retriever. Two embodiments are disclosed; the retriever can telescope out of handle end of umbrella or out of screen end of umbrella. The telescoping shaft sections are provided with mating conical portions which lock by friction upon contact at full extension. The golf ball retriever is a ring with a diameter less than that of the golf ball.

U.S. Pat. No. 4,744,593 (Spielman) is a retriever consisting of parallel disks mounted on a central axis. The golf ball is entrapped between the parallel disks. A telescopic handle is not taught.

U.S. Pat. No. 4,953,906 (White) is a golf ball retriever which is attachable to the grip end of a golf club and which retrieves the ball in a partial loop at the retrieving end.

U.S. Pat. No. 4,957,319 (Bontempo) is a receiver consisting of a plurality of elongated rods disposed and spaced generally parallel in relation to each other and mounted at their opposite ends to a pair of end plates. The retriever forms a receptacle for golf balls and provides a means for attaching a handle thereto.

U.S. Pat. No. 4,844,526 (Young) is a golf ball retriever comprising a partially ellipsoidal basket having a pocket for retaining a golf ball at the basket's far end and a telescoping pole attached to the near end. The pole of the present invention is not taught.

U.S. Pat. No. 4,799,725 (Anderson) is a golf ball retriever consisting of a uniquely shaped net which is removably attached to the end of an existing ball retriever.

U.S. Pat. No. 4,645,254 (Warden) is a golf ball retriever having a shaft rotatably mounted on its handle. The shaft includes a number of equally spaced flat disks which rotate on the shaft. A telescoping handle is attached to the shaft. Golf balls are captured between the spaced disks.

U.S. Pat. No. 4,687,204 (Lempio) is a golf ball retriever for attachment to the butt end of a golf club. The retriever consists of a scope adapted to retrieve and retain a golf ball therein. It is constructed from wire.

U.S. Pat. No. 4,693,473 (Miller) is a ball retriever consisting of a stationary support having two pivotally mounted capturing arms. A triggering mechanism biases the arms toward each other while capturing the golf ball. The retriever is preferably attached to a telescoping handle.

U.S. Pat. No. 4,515,402 (Sedan) is a golf ball retriever which is attached to the club end of a golf club and utilizes a ring for retrieving the golf ball.

U.S. Pat. No. D284,882 (Kertai et al.) is a design patent for a design of a rectangular basket-like golf ball retriever.

U.S. Pat. No. 3,520,569 (Anderson) is a golf ball retriever consisting of a wire-shaped ring. At least three frictionally engaging disks are attached to the wire ring. Alternatively, the wire ring is spiral in structure.

U.S. Pat. No. 3,421,788 (Smith). Parallel hinged capturing plates are biased toward each other by a spring after being released by a triggering mechanism. The triggering mechanism is actuated by contacting the surface of a golf ball. The pole of the present invention is not taught.

U.S. Pat. No. 3,614,149 (Clark) is a combined golf ball retriever and rake.

U.S. Pat. No. 3,547,477 (Young) is a golf ball retriever consisting of a spring loaded wire retriever which is triggered by the presence of a golf ball.

U.S. Pat. No. 3,717,371 (Halone) is a golf ball retriever comprising a box-like member with a plurality of compartments. A shutter in the normally closed position prevents entrapped golf balls from moving out of the receiving structure.

U.S. Pat. No. D266,264 (West) is a design patent for a design of a golf ball retriever consisting of two flat plates converging at the point where they are attached to the handle and each having a hole through which the surface of the golf ball protrudes when entrapped.

U.S. Pat. No. 4,136,901 (Walter) is a golf ball retriever consisting of a wire ring and adjoining curved arms. After the ring is lowered over the top of the golf ball, the arms hold the ball. The retriever is attached to a telescopic handle.

U.S. Pat. No. 4,046,413 (Jeninga) is retriever consisting of a pair of spaced wire loops, large enough to pass a golf ball therethrough which are secured to the end of a telescopic handle. A pivoted gate between the loops can block either one and serve as a support for a ball that has entered one of the retainers.

U.S. Pat. No. 5,080,413 (Vobeda) is a combination golf ball retriever and rake.

U.S. Pat. No. 4,493,503 (Jeninga) is a golf ball retriever consisting of a U-shaped frame having a pair of transversely opposed U-shaped bail members pivotally mounted between the opposed legs of the frame. The bail members pivot from the normal position to pass a golf ball there between into the retriever.

U.S. Pat. No. D304,851 (Allison et al.) is a design patent for a design of a golf ball retriever consisting of two parallel disks rotatably attached to a central axis. The golf ball is entrapped between the two disks. The retriever is mounted to a telescoping handle.

U.S. Pat. No. 4,730,859 (Gabinet) is a golf ball retriever consisting of two parallel rigid sides and elongated members connected therebetween which form an enclosure capable of encapsulating golf balls.

U.S. Pat. No. 4,968,079 (Burton) is a golf ball retriever comprising a generally spheroidal basket having an opening with dimensions sufficient to allow a golf ball to pass therethrough.

U.S. Pat. No. 4,746,156 (Kremer) is a golf ball retriever including a pair of ball engaging members pivotally mounted on a base affixed to a handle. The ball engaging members are driven closed about a ball being retrieved by a cam carried by a locking pin axially displaced upon contact with the ball.

U.S. Pat. No. 5,004,240 (Tsukamoto) is a golf ball retriever consisting of a plurality of curved prongs in the form of cantilever springs which encompass the golf ball as the prongs are protracted from their housing.

U.S. Pat. No. D306,058 (Blake) is a design patent for a design of a golf ball retriever consisting of a tube with two ends. The outer diameter of each end is large enough to allow a golf ball to pass through however the central inner diameter is reduced such that a golf ball will not pass through.

U.S. Pat. No. 4,669,770 (Spielman et al.) is a golf ball retriever consisting of a pair of disks rotating on a central axis.

U.S. Pat. No. 4,991,896 (Martin) is a golf ball retriever having a plurality of disks spaced apart by spacer tubes and secured to a central axis.

U.S. Pat. No. 3,982,781 (Tucker et al.) is a golf ball retriever having an open ended enclosure with spring means for permitting the entry of one or more golf balls to be gathered within the enclosure.

U.S. Pat. No. 3,887,225 (McKee) is a golf ball retriever consisting of a semi-enclosed ball cage with a spring driven ball-retaining plunger that, when released, holds the ball in the cage.

U.S. Pat. No. 3,669,427 (Curtis) is a golf ball retriever having pivotally mounted claw members which encapsulate the golf ball upon the depression of a central triggering pin.

U.S. Pat. No. 3,770,308 (Faber) is a golf ball retriever including a bell-shaped cup and a light weight locking pin which is freely and slidably mounted in a bore in the handle socket of the cup for movement between a ball blocking position and a retracted position permitting entry of the ball into the cup.

U.S. Pat. No. 4,180,288 (Sievers) is a golf ball retriever comprising a wire loop with a spring-wire spiral wrapped about the loop.

U.S. Pat. No. 4,254,981 (Wilson) is a golf ball retriever consisting of a flat plate having a plurality of retrieving fingers pivotally attached thereto. The free end of each finger is curved rearwardly in the general direction of the telescoping handle. The distance between the free ends of adjacent fingers is slightly less than the diameter of a golf ball.

U.S. Pat No. 4,334,707 (Phillips) is a golf ball retriever consisting of a base with a plurality of ball engaging loops of flexible, resilient wire having one end cantilevered from the base and extending endwise from the sides of the base. The base is attached to a telescopic pole. The pole structure is not taught.

U.S. Pat. No. 4,313,632 (King) is a golf ball retriever having prongs for scooping a golf ball and fingers for gripping a golf ball after it is retrieved.

None of the above mentioned patents discloses the unique features of the present invention. The present invention overcomes the problems of the prior art designs. It provides an improved golf ball retriever that may trap a golf ball from either end of a cylindrical catcher device, yet still retain the ball from falling out either end. The prior art does not contain such a device. Further, the structure of the telescoping pole of the present invention is such that it may be easily and quickly manufactured.

SUMMARY OF THE INVENTION

The golf ball retriever comprises a cylindrical receiving tube slightly larger in diameter than a golf ball, having a plurality of triangular or rib protrusions radially attached and directed toward the inside of the cylinder, a substantially V-shaped catch guard with a limited arc of movement such that it prevents a golf ball from falling out of the receiver but also allows the ball to fit into the receiver; a telescoping rod comprising a plurality of pieces of hollow tubing, becoming smaller in diameter so that when joined the plurality of pieces of hollow tubing may be collapsed into one another creating a compact and easy to carry retriever, end caps with special glue reservoirs, end plugs, and plastic shims inserted between two concentric pieces of hollow tubing to provide frictional engagement suitable to hold the pieces of hollow tubing in the position to which the tubing has been extended.

There exist two different sizes of golf balls. A standard or regular golf ball has a diameter of 1.68 inches (4.267). The newer Magna golf ball has a larger diameter of 1.72 inches (4.369 cm). Both golf ball sizes fit into the receiver of my invention.

The shape of the plastic shim is important. Any shims used in the prior art have generally been rectangular in shape and used primarily to avoid rubbing of the tubes placed against one another in a telescoping rod. The shape of the shim in the present invention is essentially triangular, with the points of the triangle truncated to form a box-like triangle. Because of its unique shape, the shim is easily placed between the concentric pieces of tubing, and allows easy adjustment of the position of the tubing without slippage. Also, this truncated triangular shape eliminates the need for use of an insertion tool. This creates an easy assembly pole having excellent performance characteristics.

The plurality of triangular protrusions extending radially inward from the cylindrical receiver are sloped at 5 to 11 degrees. This slope is important. The slope of the triangular protrusions creates a center catching diameter less than that of a standard or Magna golf ball. This opening of diameter smaller than a standard or Magna golf ball tends to trap a golf ball in a plain cylindrical receiver, but this is a problem in the prior art because the ball will remain trapped only if the receiver is not turned over or the ball is sufficiently wedged in place so that other hazards like current in a water hazard, such as a river, do not push the golf ball out of the cylinder. To combat this problem, the present invention also contains the substantially V-shaped catch guard, or retainer. This catch guard is mounted with a mounting shaft to the end of the smallest piece of hollow tubing of the telescoping rod. The two arms of the retainer extend outward over a portion of the cylindrical receiver. The receiver is pivotally mounted to the catch guard by tabs. The tabs extend outwardly from the outer surface of the receiver, and have holes that align with a hole in the catch guard. Once the holes are aligned, a pin connects the receiver to the catch guard. The arc of movement of the receiver is limited by a stop. The arc of movement is enough so that the receiver will rotate enough to allow a golf ball to pass between one of the protruding arms and the opposite side of the cylindrical receiver, but will also prevent the ball from falling out of the cylinder once it is trapped. This design provides two mechanisms by which the ball may be trapped. Additionally, it eliminates the problem of the golf ball falling out of the golf ball retriever when the retriever is tilted during retrieval or current in the water hazard attempts to push the ball out of the retriever.

DESCRIPTION OF THE DRAWINGS

FIG. 12 shows a perspective view of the golf ball retriever.

FIG. 13 shows an end view of the ball retainer taken along line 13—13 of FIG. 5.

FIG. 14 shows an exploded perspective view of the receiver end of the golf ball retriever.

FIG. 15 shows a sectional view of the preferred embodiment of the receiver taken along line 15—15 of FIG. 14.

FIG. 16 shows a perspective view of a fourth alternative embodiment of the golf ball retriever.

FIG. 17 shows a sectional view of the fourth alternative embodiment of the present invention taken along line 17—17 of FIG. 16.

FIG. 18 shows a sectional view of the fourth alternative embodiment of the present invention taken along line 18—18 of FIG. 16.

FIG. 19 shows a perspective view of the retriever end of the fourth alternative embodiment of the golf ball retriever.

DETAILED DESCRIPTION

Figure 1:
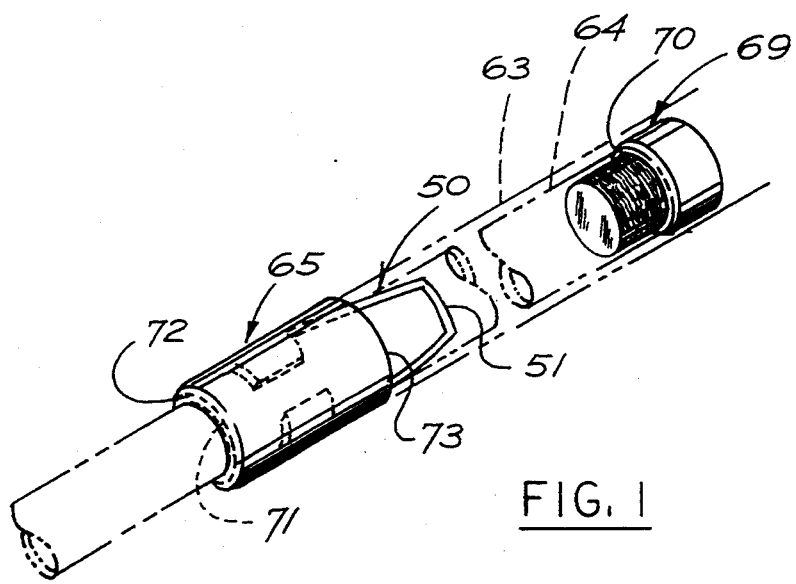
FIG. 1 shows a perspective view of two concentric pieces of hollow tubing joined at their ends.
Figure 2:
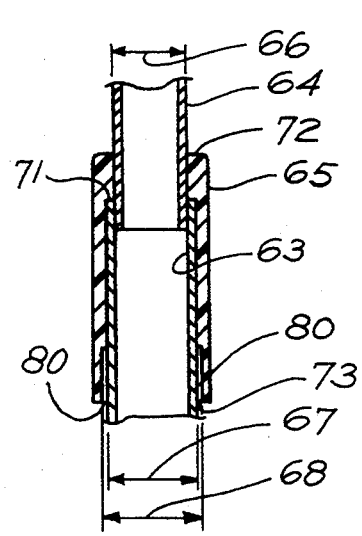
FIG. 2 shows a partial sectional view of two pieces of hollow tubing and a cap.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Referring to FIG. 12, the preferred embodiment of the present invention 10 may be seen. The invention 10 is a golf ball retriever. It main components are the telescoping rod 60, the ball receiver 30, and the retainer 40 which may also be called a ball cam or catch guard.

Referring to FIG. 14, the retainer 40 and ball receiver 30 may be seen in greater detail. Ball receiver 30 is generally cylindrical in shape. The diameter of ball receiver 30 is slightly larger than that of a standard or Magna golf ball. A plurality of triangular protrusions or ribs 31 extend inwardly from inner surface 36 of ball receiver 30. Triangular protrusions or ribs 31 reach their peak 37, sloping upward and out from the inner surface 36 of the ball receiver 30 at an angle 34 that is 5 to 11 degrees. The receiver 30 has two tabs 32 extending outwardly from the outer surface 38 of the ball receiver 30. Each of the tabs 32 has a hole 35 for allowing pivotal attachment of retainer 40 to receiver 30. Retainer 40 has a hole 41 that aligns with the holes 35 in ball receiver 30. Pin 42 is inserted through holes 35 and 41 to pivotally mount receiver 30 on retainer 40. Receiver 30 also has a stop 33 between the tabs 32. Stop 33 acts to restrict the arc of movement of receiver 30 by blocking against first arm 45 or second arm 46 of the retainer 40, limiting further angular motion of receiver 30 when stop 33 hits first arm 45 or second arm 46. The arc of movement of receiver 30, as limited by stop 33, is such that the gap between first arm 45 or second arm 46 and receiver 30 will allow the golf ball to enter receiver 30. Receiver 30 will then rotate back to a position where retainer 40 can trap the ball in receiver 30. First arm 45 and second arm 46 have teeth 43 at their respective ends 47 and 48. Teeth 43 help to retain the golf ball in receiver 30.

Figures 3, 4:
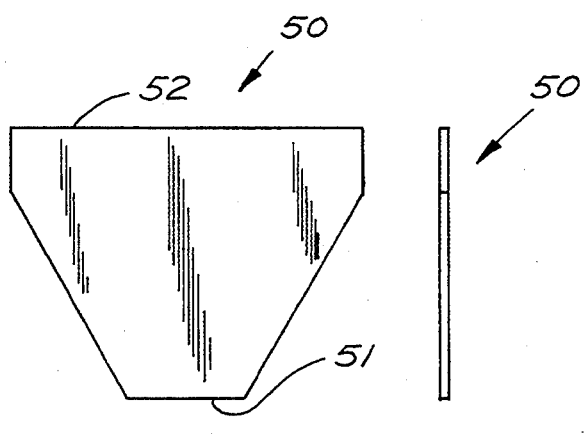
FIG. 3 shows a front view of the plastic shim.
FIG. 4 shows a side view of the plastic shim.
Figure 5:
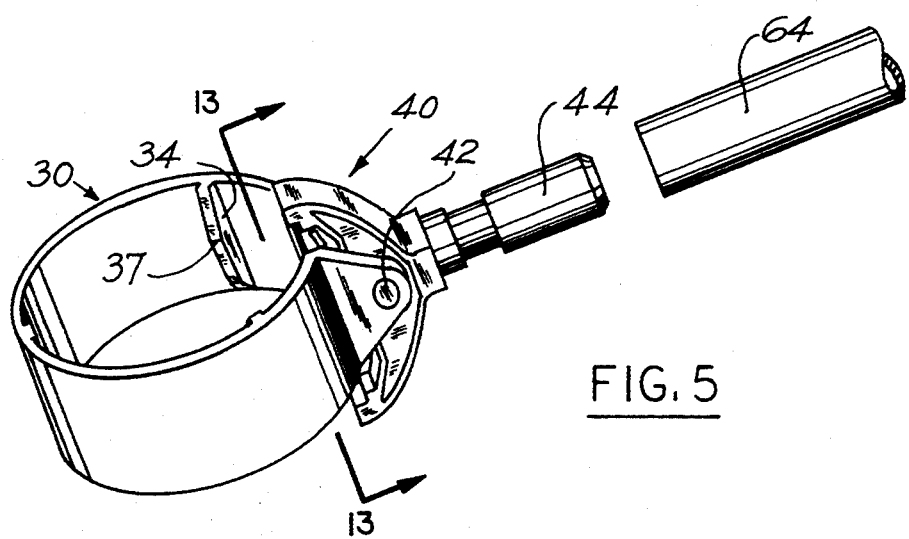
FIG. 5 shows a perspective view of the receiver end of the current invention.

Retainer 40 has a mounting shaft 44 for attaching retainer 40 and receiver 30 to the smallest piece of hollow tubing 64 of telescoping rod 60. Referring to FIG. 1, the connection of two pieces of hollow tubing 63 and 64 is shown. This connection is the same for all other connections. Plug 69 fits into end 70 of hollow tubing 64. Shim 50 wraps around the narrowest piece of hollow tubing 64. Referring to FIGS. 3 and 4, it may be seen that shim 50 is tapered to have a narrow end 51 and a wide end 52. This taper is to allow ease of placement of shim 50 and hollow tubing 64 into hollow tubing 63. The two pieces of hollow tubing 63 and 64 are joined by inserting end 70 and plug 69 along with shim 50 into a corresponding opposite end 71 of the larger piece of hollow tubing 63. Cap 65 slides over the narrow piece of hollow tubing 64 to the end of the larger piece of hollow tubing 63. Cap 65 is then glued in place to the larger piece of hollow tubing 63. Cap 65 has three (3) different inner diameters 66, 67, and 68. Inner diameter 66 is slightly smaller than the outer diameter of the larger piece of hollow tubing 63. This inner diameter 66 is located at the top 72 of the cap 65. Inner diameter 67 is slightly larger than the outer diameter of the larger piece of hollow tubing 63 so that cap 65 may slide freely over the larger piece of hollow tubing 63 where it may be glued in place. Inner diameter 67 extends from near the top 72 of cap 65 to near the bottom 73 of cap 65. Inner diameter 68 is slightly larger than inner diameter 67. The space formed between the inner surface of cap 65 at inner diameter 68 and the outer surface of the larger piece of hollow tubing 63 forms a reservoir 80 into which glue or another adhesive may be placed. The adhesive seals the cap 65 to the larger piece of hollow tubing 63.

Accordingly, the method of assembly of the telescoping rod 60 is as follows: In the first step, plug 69 is inserted into end 70 of hollow tubing 64. In the second step, shim 50 is wrapped around hollow tubing 64 near end 70, with the narrow end 51 of shim 50 nearest end 70. The third step is inserting the shim 50 and the plugged hollow tubing 64 into end 71 of the larger piece of hollow tubing 63. Following that comes step four in which cap 65 is placed over the intersection of hollow tubes 63 and 64, so that inner diameter 66 butts up against end 71 of the larger piece of hollow tubing 63. The fifth, and final, step is to affix cap 65 to the larger piece of hollow tubing 63 by putting glue or another suitable adhesive in the reservoir 80 formed between the inner surface of cap 65 at inner diameter 68 and the outer surface of the larger piece of hollow tubing 63. At the end of the largest diameter tube a handle is placed.

Figure 6:
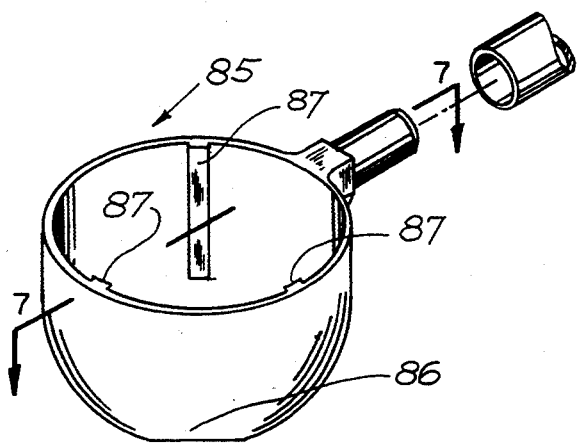
FIG. 6 shows a perspective view of an alternative embodiment of the present invention.
Figure 7:
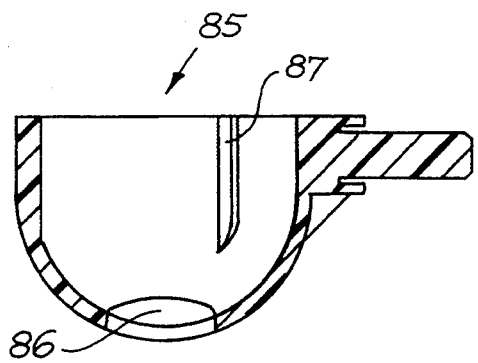
FIG. 7 shows a sectional view of the first alternative embodiment of the present invention taken along line 7—7 of FIG. 6.
Figure 8:
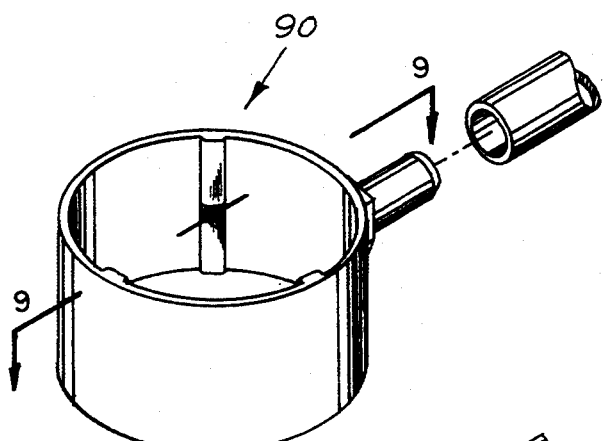
FIG. 8 shows a perspective view of a second alternative embodiment of the present invention.
Figure 9:
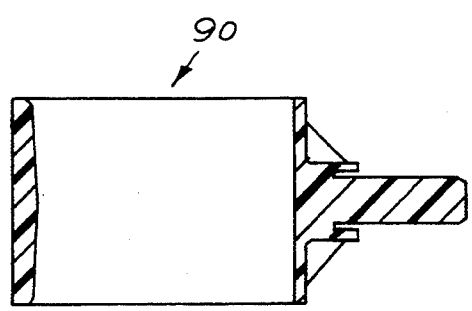
FIG. 9 shows a sectional view of the second alternative embodiment of the present invention taken along line 9—9 of FIG. 8.
Figure 10:
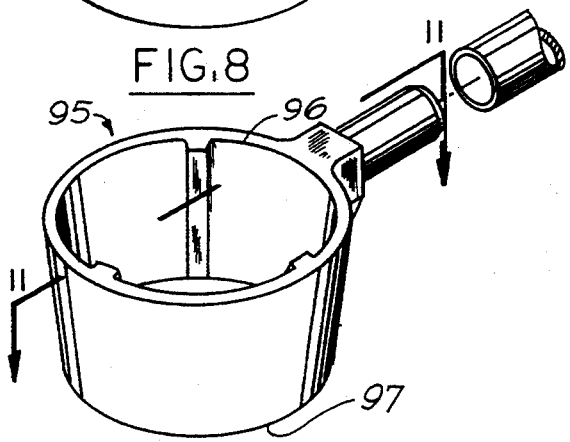
FIG. 10 shows a perspective view of a third alternative embodiment of the present invention.
Figure 11:
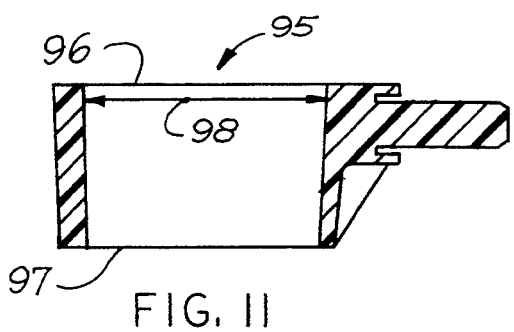
FIG. 11 shows a sectional view of the third alternative embodiment of the present invention taken along line 11—11 of FIG. 10.

FIGS. 6 through 11 show alternative embodiments of the receiver 30. FIGS. 6 and 7 show a cylindrical receiver 85 with a spherically tapered end 86 and straight protrusions 87. A standard or Magna golf ball is trapped by scooping it up in the receiver 85. FIGS. 8 and 9 show a cylindrical receiver 90 with the design of receiver 30, but without retainer 40, tabs 32, and stop 33. FIGS. 10 and 11 show a generally cylindrical receiver 95 that tapers from top 96 to bottom 97, with its inner diameter 98 narrowing from top 96 to bottom 97. In all of these alternative embodiments of receiver 30, the receiver is mounted directly to the smallest piece of hollow tubing 64.

FIG. 16 through 19 show a fourth alternative embodiment of the golf ball retriever. Referring to FIG. 16, the retainer 140 and ball receiver 130 may be seen in greater detail. Ball receiver 130 is generally cylindrical in shape. The diameter of ball receiver 130 is slightly larger than that of a standard or Magna golf ball. A plurality of protrusions or ribs 131 extend inwardly from inner surface 136 of ball receiver 130. As shown in FIG. 18, protrusions or ribs 131 slope upward and outward from inner surface 136 forming a first face 152, break at 156, continue with a greater upward slope forming a second face 156 and peak at 137. The angle of face 152, the entry angle, is 23° with respect to vertical inner surface 136 in the preferred embodiment. However, this angle can vary significantly without affecting the function of the golf ball retriever. The angle of face 156 is 7° with respect to vertical inner surface 136 in the preferred embodiment. This interior angle, which is critical to the proper performance of the golf ball retriever, can vary from 5° to 11°.

A circumferential rib 150 extends around the inner surface 136 of ball receiver 130 as shown in FIG. 17. The receiver 130 has two tabs 132 extending outwardly from the outer surface 138 of the ball receiver 130, each of the tabs 132 has a hole 135 for allowing pivotal attachment of retainer 140 to receiver 130. Retainer 140 has a hole 141 that aligns with the holes 135 in ball receiver 130. Pin 142 is inserted through holes 135 and 141 to pivotally mount receiver 130 on retainer 140. Receiver 130 also has a stop 133 between the tabs 132, stop 133 acts to restrict the arc of movement of receiver 130 by blocking against first arm 145 or second arm 146. The arc of movement of receiver 130, as limited by stop 133, is such that the gap between first arm 145 or second arm 146 and receiver 130 will allow the golf ball to enter receiver 130. Receiver 130 will then rotate back to a position where retainer 140 can trap the ball in receiver 130.

First arm 145 and second arm 146 have protrusions 143 at their respective ends 147 and 148. Each protrusion 143 has a tooth 151 which helps to retain both a standard size and Magna size golf ball in receiver 130. Retainer 140 has a mounting shaft 144 for attaching retainer 140 and receiver 130 to the smallest piece of hollow tubing of telescoping rod 60.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A golf ball retriever comprising:
   a cylindrical receiver having an inner surface with a diameter slightly larger than a standard golf ball, the receiver having at least one rib extending inwardly from the inner surface, two tabs having openings, and a stop between the tabs;
   a retainer having an opening, a mounting shaft, a first arm with a first end, and a second arm with a second end, each of the arms having teeth at its end;
   the receiver rotatably connected to the retainer by a pin engaging the tab openings and the retainer opening;
   the stop limiting angular motion of the receiver.

2. The golf ball retriever of claim 1, wherein the rib is a triangular protrusion that extends inwardly with a slope of 5 to 11 degrees relative to the inner surface.

3. The golf ball retriever of claim 1, further comprising:
   a telescoping rod having at least two pieces of hollow tubing with different diameters, at least one cap, at least one plug, and at least one shim;
   the shim being shaped to form a substantially triangular shape;
   the shim placed between the pieces of hollow tubing;
   the two pieces of hollow tubing being connected by frictional engagement of the shim and the tubing;
   the cap fitting over the engagement of the shim and the pieces of hollow tubing;
   the plug fitting in the end of the smaller diameter piece of hollow tubing;
   the retainer mounted to the smaller diameter piece of hollow tubing by the mounting shaft.

4. The golf ball retriever of claim 3, wherein the rib extends inwardly with a slope of 5 to 11 degrees relative to the inner surface.

5. A telescoping rod for a golf ball retriever, the telescoping rod comprising:
- at least two pieces of hollow tubing with different diameters;
- at least one cap;
- at least one plug;
- at least one shim;
- the shim being shaped like a triangle with its corners trimmed off;
- the shim placed between the pieces of hollow tubing;
- the two pieces of hollow tubing being connected by frictional engagement of the shim and the tubing;
- the cap fitting over the engagement of the shim and the pieces of hollow tubing;
- the plug fitting in the end of the smaller diameter piece of hollow tubing.

6. The telescoping rod of claim 5 wherein one of the pieces of hollow tubing has a connecting end;
- a golf ball retriever connected to the piece of hollow tubing at the connecting end.

7. A method for making a telescoping rod for a golf ball retriever, the method comprising:
- (a) inserting a plug into a first end of a first piece of hollow tubing;
- (b) wrapping a tapered shim having substantially triangular shape around the first piece of hollow tubing near the end;
- (c) inserting the tapered shim and the plugged first piece of hollow tubing into an end of a second larger piece of hollow tubing;
- (d) placing a cap over the intersection of the first and second pieces of hollow tubing; and
- (e) gluing the cap to the end of the second larger piece of hollow tubing.

8. The method according to claim 7, wherein the steps thereof are repeated in sequence, using a second larger piece of hollow tubing as the first piece of hollow tubing, until a predetermined number of pieces of hollow tubing are joined.

9. The method according to claim 7, which further comprises:
- mounting to the smallest piece of hollow tubing a golf ball retriever.

* * * * *